Feb. 23, 1960     O. H. CARROLL     2,925,955
VALVE LOCKING DEVICE
Filed Dec. 5, 1955
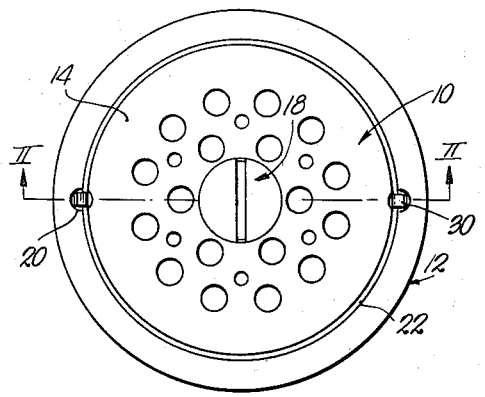
*Fig. 1.*
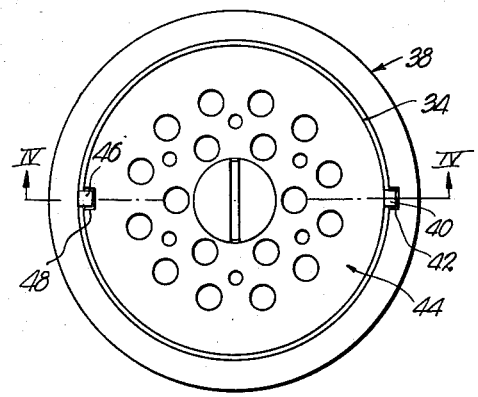
*Fig. 3.*
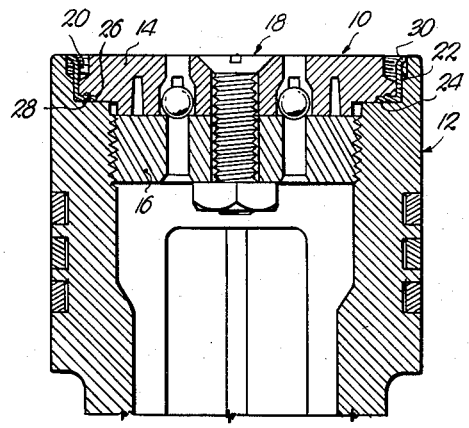
*Fig. 2.*
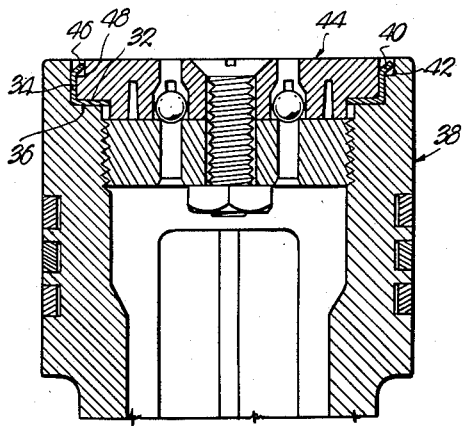
*Fig. 4.*
INVENTOR.
Oren H. Carroll
BY 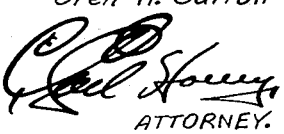
ATTORNEY.

2,925,955

VALVE LOCKING DEVICE

Oren H. Carroll, Merriam, Kans.

Application December 5, 1955, Serial No. 551,095

3 Claims. (Cl. 230—221)

This invention relates to improvements on fluid control valves and particularly to suction and discharge valves for compressors and the like, the primary object being to provide a locking device for positively preventing dislodgment of the valve body with respect to the hollow piston within which it is mounted.

Valve bodies for reciprocable pistons of compressors are normally removably mounted within the piston and the rapid rate of reciprocation of the piston results in loosening of the valve body unless locking means is provided to prevent relative rotation. Heretofore, it has been common practice to interlock such elements by inserting setscrews within tapped openings formed between the valve body and the piston. Such locking means is unsatisfactory for the reason that the openings seldom re-align when the valves are replaced and after a period of time a large number of tapped openings are formed in the valve and the piston.

It is the most important object of the present invention therefore, to provide a locking device in the nature of a ring interposed between the valve and the piston and having means thereon for locking the same not only to the piston, but to the valve body so that the latter will not rotate during reciprocation.

Another important object of the instant invention is to provide a band-like ring member for locking valve bodies to pistons and which may either be employed to utilize the aforementioned tapped openings or other recesses as a means of attachment to the valve body and/or the piston.

Other objects relate to important details of construction to be made clear as the following specification progresses.

In the drawing:

Figure 1 is a top plan view of a multiple ball valve embodying a locking device made pursuant to one form of the instant invention.

Fig. 2 is a fragmentary, cross-sectional view taken on line II—II of Fig. 1.

Fig. 3 is a plan view of another embodiment of the invention; and

Fig. 4 is a fragmentary, cross-sectional view taken on line IV—IV of Fig. 3.

The particular nature of the ball-type valve 10, as well as tubular piston 12 shown in the drawing, forms no part of the instant invention, it being initially observed that the locking device about to be described is employed for the purpose of preventing rotation of the valve body 10 with respect to the piston 12.

Valve 10 is composed of a pair of plate-like sections 14 and 16 interconnected by bolt and nut means 18. The section 16 is screw-threaded within the piston 12 and, therefore, by virtue of the rapid rate of reciprocation of the latter, it is necessary to lock the valve 10 to the piston 12 to prevent dislodgment.

Heretofore it has been common practice to provide a tapped opening 20 within the valve section 14 and the piston 12 for receiving a setscrew. Such means of locking is unsatisfactory for the reason that upon removal of valve 10 and replacement, or upon substitution of a new valve, the two parts of the tapped opening 20 seldom realign. Therefore, it becomes necessary to tap an additional opening and ultimately a large number of such openings are formed in the valve and the piston.

In the form of my invention illustrated by Figs. 1 and 2 of the drawing, the tapped openings 20 provide recesses for permitting attachment of the locking device to the valve 10 and/or the piston 12. Such locking device is in the nature of ring means consisting of an annular band 22 surrounding the valve section 14 between the latter and the piston 12.

Band 22 is provided with an inturned, radial flange 24 on one edge thereof and which is clamped in place between the valve section 14 and the piston 12, as seen in Fig. 2. Valve section 14 is provided with an annular cavity 26 for receiving the flange 24 and the locking device is attached to the valve section 14 by providing one or more dimples 28 in the flange 24 and driven into the valve section 14.

The locking device is attached to the piston 12 by the provision of one or more outturned ears 30 that extend into the recesses or openings 20 above described.

It is seen from the foregoing that, by virtue of projections 28 and 30 extending into corresponding recesses within the valve 10 and piston 12 respectively, the valve 10 cannot rotate relative to the piston 12. The locking device is advantageous further because of the fact that the laterally-extending ears 30 may be easily and quickly stamped therefrom, making it unnecessary to tap additional openings in the piston and the valve when the valve is removed and subsequently replaced.

Manifestly, the dimples 28 might well be formed in the upper surface of flange 24 to present projections extending into the piston 12, whereupon, the locking device would be attached to the valve 10 by striking ears 30 inwardly into that portion of the recess 20 formed in valve section 14.

In that form of my invention illustrated by Figs. 3 and 4 of the drawing, the annular cavity 26 is eliminated and flange 32 on band 34, extends entirely across upwardly-facing, annular shoulder 36 on piston 38. The uppermost edge of the band 34 is provided with one or more projections in the nature of outwardly-extending ears 40 stamped therefrom which extend into recesses taking the form of a slot 42 provided in the piston 38. The band 34 is similarly locked to the valve body 44 by one or more projections or inwardly-extending radial ears 46 that extend into recesses or slots 48 within the valve body 44. Here again it is unnecessary to form additional slots 42 or 48 when the valve 44 is removed and replaced, since it is but necessary to strike additional ears in the band 34 if the valve body 44 does not assume the same position relative to piston 38 when threaded into the latter in clamping relationship to flange 32.

Having thus described the invention what is claimed as new and desired to be secured by Letters Patent is:

1. In combination with a tubular piston having a valve body screw-threaded thereinto at one end of the piston, a locking device for holding the body against rotation relative to the piston comprising a band surrounding the body and clamped between the latter and the piston, said band having a radially inturned ear and a radially outturned ear on one edge thereof, said piston having a recess receiving the outturned ear, said body having a recess receiving the inturned ear.

2. In combination with a tubular piston having a valve body screw-threaded thereinto at one end of the piston, a locking device for holding the body against rotation relative to the piston comprising a substantially L-shaped band surrounding the body between the latter and the piston, said band having a radially inturned flange clamped between the body and the piston; a radially outturned ear on one edge of the band, said piston having a recess receiving the ear; and a radially inturned ear on said one edge of the band, said body having a recess receiving said inturned ear.

3. In combination with a tubular piston having a valve body screw-threaded thereinto at one end of the piston, a locking device for holding the body against rotation relative to the piston comprising a substantially L-shaped band surrounding the body between the latter and the piston, said band having a radially inturned flange underlying a portion of the body and clamped between said portion of the body and the piston; a radially outturned ear on one edge of the band, said piston having a recess receiving the ear; and means on said one edge of the band extending into the body for attaching the device to the body.

References Cited in the file of this patent

UNITED STATES PATENTS

| | | |
|---|---|---|
| 481,850 | Dillenburg | Aug. 30, 1892 |
| 1,511,649 | Wentzell | Oct. 14, 1924 |
| 2,078,347 | Shepherd et al. | Apr. 27, 1937 |
| 2,142,712 | Brandt | Jan. 3, 1939 |
| 2,192,378 | Horger | Mar. 5, 1940 |
| 2,619,392 | Brown | Nov. 25, 1952 |